United States Patent
Oprescu-Surcobe et al.

(10) Patent No.: US 7,061,879 B2
(45) Date of Patent: Jun. 13, 2006

(54) METHOD AND APPARATUS FOR EXTENDING COMMUNICATION UNIT BATTERY LIFE

(75) Inventors: Valentin Oprescu-Surcobe, Northbrook, IL (US); John M. Harris, Chicago, IL (US); Ronald T. Crocker, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 1020 days.

(21) Appl. No.: 09/928,140

(22) Filed: Aug. 10, 2001

(65) Prior Publication Data

US 2003/0031140 A1     Feb. 13, 2003

(51) Int. Cl.
G08C 17/00     (2006.01)
H04B 1/16     (2006.01)

(52) U.S. Cl. .................. 370/311; 340/732; 455/343.1
(58) Field of Classification Search ........ 370/310–311; 455/343.1–343.6; 340/7.32–7.38
See application file for complete search history.

(56) References Cited

U.S. PATENT DOCUMENTS

| | | | |
|---|---|---|---|
| 5,655,215 A | * | 8/1997 | Diachina et al. ......... 455/426.1 |
| 5,930,706 A | | 7/1999 | Raith |
| 6,138,034 A | | 10/2000 | Willey |
| 6,216,004 B1 | | 4/2001 | Tiedemann, Jr. |
| 6,223,047 B1 | * | 4/2001 | Ericsson ................ 455/517 |
| 2004/0120386 A1 | * | 6/2004 | Grilli et al. ............. 375/148 |
| 2004/0171400 A1 | * | 9/2004 | Rosen et al. ............ 455/518 |

FOREIGN PATENT DOCUMENTS

| | | |
|---|---|---|
| GB | 2 354 911 A | 4/2001 |
| WO | WO 98/48521 A2 | 10/1998 |
| WO | WO 00/10353 A1 | 2/2000 |

OTHER PUBLICATIONS

Newton, Newton's Telecom Dictionary, Oct. 1998, Telecom Books, p. 181.*
Merriam-Webster, 1997, Merriam-Webster, Inc., 10th Edition, p. 1278.*

* cited by examiner

Primary Examiner—Chi Pham
Assistant Examiner—Ronald Abelson
(74) Attorney, Agent, or Firm—Jeffrey K. Jacobs

(57) ABSTRACT

To address the need for a communication unit, a communication infrastructure, and method that extend battery life, the present invention provides a special page message (200) that is transmitted toward the beginning of a paging slot to indicate what groups of messages will be transmitted in the paging slot. This message allows communication units (e.g., 102–104) to determine near the beginning of the paging slot whether they need to continue monitoring the paging slot for messages or pages directed or of interest to them. The message also allows communication units that continue monitoring the paging slot to determine when they can cease the monitoring. Thus, communication units can return to a power-saving sleep mode more quickly than the prior art.

18 Claims, 3 Drawing Sheets

METHOD AND APPARATUS FOR EXTENDING COMMUNICATION UNIT BATTERY LIFE

FIELD OF THE INVENTION

The present invention relates generally to the field of wireless communications and, more particularly, to extending communication unit battery life in wireless communication systems.

BACKGROUND OF THE INVENTION

Many battery powered communication units have a sleep mode in which they are able to conserve power by powering down components such as their receivers. These communication units then "wake up" periodically to determine if any messages (pages) are going to be transmitted to them. If there are no messages that the communication unit needs to receive, it will power down in order to extend its battery life. Next generation Code-Division Multiple-Access (CDMA) cellular communication systems, more commonly referred to as CDMA 2000 or Wideband CDMA systems, incorporate such power saving techniques. Each communication unit within a CDMA 2000 system is normally able to determine to which group of four, 20 millisecond (ms), synchronous frames on its paging channel (PCH) it is assigned. This group of frames, referred to as its "paging slot," is used by the infrastructure to transmit messages to the particular unit. Thus, a communication unit in so-called "slotted mode" operation exits its sleep mode in order to monitor transmissions associated with its assigned paging slot. The more quickly a communication unit can determine that it has no messages or no more messages to receive, the more quickly it can return to sleep mode and conserve power, further extending its battery life.

The communication unit marketplace today is extremely competitive. Consumers demand units that offer the longest talk-time with relatively infrequent recharging cycles, i.e., with longer battery lives. Thus, a communication unit, a communication infrastructure, and method that extend battery life by enabling the communication unit to perform this determination more quickly are needed.

DESCRIPTION OF A PREFERRED EMBODIMENT

To address the need for a communication unit, a communication infrastructure, and method that extend battery life, the present invention provides a special page message that is transmitted toward the beginning of a paging slot to indicate what groups of messages will be transmitted in the paging slot. This message allows communication units to determine at the beginning of the paging slot whether they need to continue monitoring the paging slot for messages directed to them. The message also allows communication units that continue monitoring the paging slot to determine when they can cease the monitoring. Thus, communication units can return to a power-saving sleep mode more quickly than using the prior art.

Figure 1:
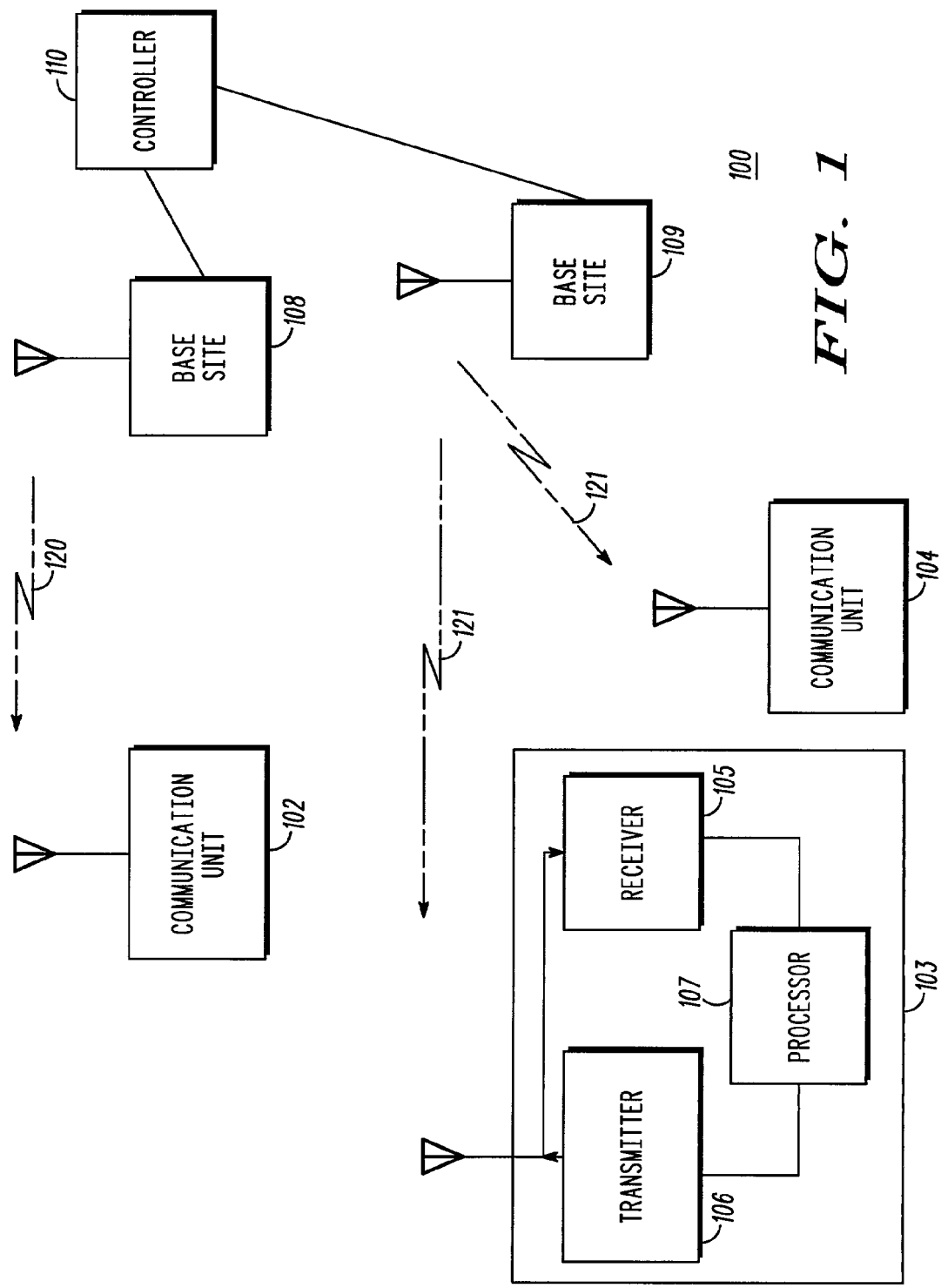
FIG. 1 is a block diagram depiction of a communication system in accordance with a preferred embodiment of the present invention.

The present invention can be more fully understood with reference to FIGS. 1–4. FIG. 1 is a block diagram depiction of communication system 100 in accordance with a preferred embodiment of the present invention. Preferably, communication system 100 is a system in accordance with the well-known Telecommunications Industry Association/Electronic Industries Association Interim Standard 2000 (TIA/EIA IS-2000 or CDMA 2000) modified as described below to implement the present invention.

System 100 comprises fixed network equipment and mobile communication units. The fixed network equipment, or communication infrastructure, include base sites 108 and 109 and controller 110 that are preferably networked to other base sites, controllers, and switches, all part of the fixed network equipment of system 100 and all well known to those skilled in the art. For simplicity, only base sites 108 and 109 and controller 110 of the fixed network equipment is shown in FIG. 1. Again for simplicity, only three of what could be thousands of mobile communication units are shown in FIG. 1. Communication units 102–104 each preferably comprise CDMA-capable wireless phones that receive communications from base sites 108 and 109 via a CDMA air interface. Communication resources 120 and 121 each comprise a paging channel (PCH) or a forward common control channel (FCCH) of base sites 108 and 109, respectively.

Each of the communication units 102–104 comprises a common set of elements, a transmitter, a receiver, and a processor. In particular, processor 107 comprises one or more processing devices (e.g., microprocessors, digital signal processors, etc.) and memory devices and is coupled to transmitter 106 and receiver 105. Each of these elements is well-known in the art. In the preferred embodiment, under the control of software algorithms stored in the memory devices of processor 107 and in cooperation with the other elements shown, the processor 107 performs those tasks required for operation of communication unit 103, including the method described relative to FIG. 4.

Base sites 108 and 109 and controller 110 also comprise elements well-known in the art such as transmitters, receivers, and a processors. In the preferred embodiment, under the control of software algorithms stored in the memory devices of base sites 108 and 109 and controller 110, the communication infrastructure performs those tasks required for operation, including the method described relative to FIG. 3. While depicted as a separate box in FIG. 1, the physical implementation of controller 110 may take many forms, all well-known to those skilled in the art. For example, the logical control functions performed by controller 110 may be physically distributed among processors on multiple physical platforms, physically distributed among the processors of the base sites, or physically performed by a processor on a single physical platform.

Operation of preferred communication system 100, in accordance with the present invention, occurs substantially as follows. Controller 110 determines what groups of messages will be transmitted during paging slots transmitted by base sites 108 and 109. Preferably, "groups" refers to both what message types will be transmitted and what paging hash categories correspond to the communication units addressed by the messages. The paging hash categories are based on the communication unit IDs, each ID corresponding to a hash category, and the different message types include broadcast messages, system overhead messages, nonslotted individually addressed/multicast messages, slotted individually addressed/multicast messages and pages. Thus, the controller considers what messages are going to be transmitted in the paging slot, determines which of the different message types are represented, and determines which paging (or addressing) hash categories have units that will be addressed by the messages.

Base sites 108 and 109 then transmit in paging slots on PCH (or FCCH) 120 and PCH (or FCCH) 121 an indication of what groups of messages will be transmitted during the paging slots. Preferably, this indication takes the form of a special paging message that is transmitted before the other messages in the paging slots. Base sites 108 and 109 then transmit in the paging slots the specific messages of the groups indicated.

Communication unit 103, for purposes of illustration, will be said to be assigned to the paging slot transmitted by base site 109 on PCH (or FCCH) 121. Thus, processor 107 of unit 103 instructs the receiver to exit a sleep mode in which power is conserved to begin monitoring the paging slot. Receiver 105 then receives the indication of what groups of messages will be transmitted during the paging slot. Processor 107 can now determine whether any of the groups of messages indicated need to be received by the communication unit. If none do, then processor 107 can instruct the receiver to immediately enter a sleep mode and conserve power without having to expend the power required to continue monitoring the paging slot.

To determine whether any of the groups of messages indicated need to be received, processor 107 preferably considers whether any of the message types indicated in the special paging message need to be received or whether the special paging message indicates that one or more units in unit 103's paging hash category will be addressed. If either is the case, unit 103 will continue monitoring the paging slot. Preferably, the special paging message will also indicate a relative transmit ordering of messages of the same type in the paging slot. Ascending order by communication unit address/ID is the relative transmit ordering used in the preferred embodiment. Thus, receiver 105 also receives the indication of relative transmit ordering in the special paging message.

As receiver 105 continues to monitor the paging slot and receives zero or more messages either explicitly addressed to unit 103 or of a message type needed, processor 107 determines whether all of the needed messages have been received, preferably based on the indication of relative ordering. When processor 107 determines that all the needed messages, if any, in the paging slot have been received, it instructs receiver 105 to enter the sleep mode to conserve power. Thus, the present invention enables unit 103 to conserve power by entering a sleep mode before all the messages in the paging slot are transmitted.

Figure 2:
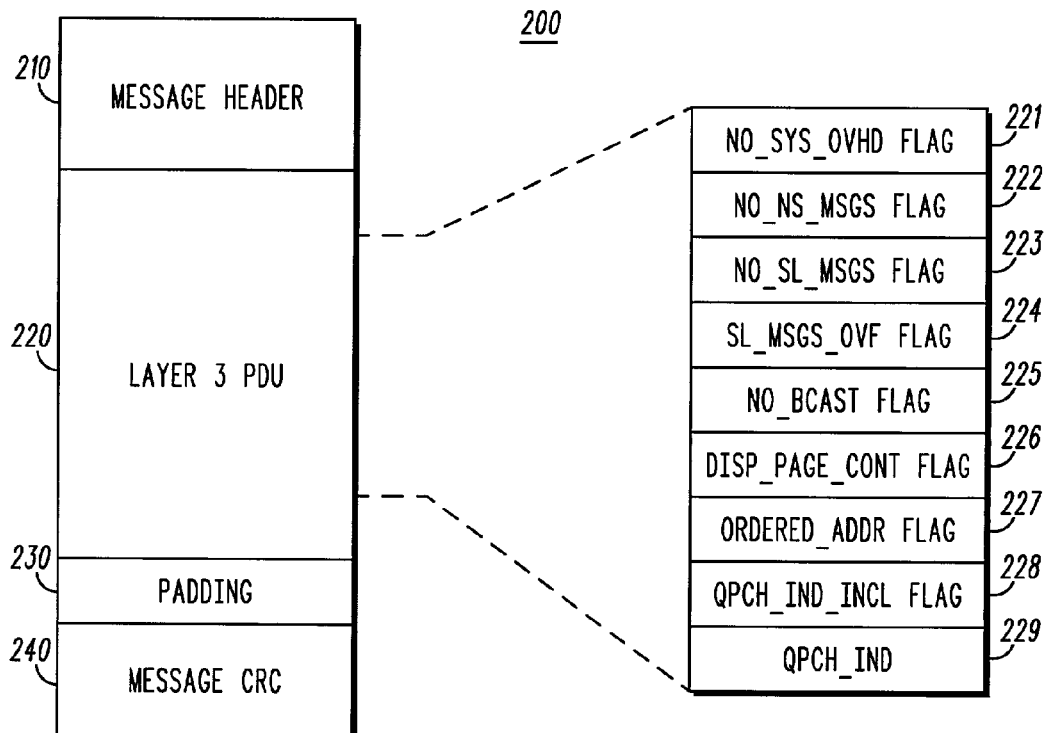
FIG. 2 is a logical, block diagram depiction of a special page message in accordance with a preferred embodiment of the present invention.

FIG. 2 is a logical, block diagram depiction of special page message 200 in accordance with a preferred embodiment of the present invention. Special page message 200 is preferably an IS-2000-4 compatible message that comprises a message header 210, layer 3 protocol data unit (PDU) 220, padding 230, and message CRC 240. Message 200 is preferably encoded and interleaved before being transmitted on a PCH, and alternatively it may also be transmitted on a forward common control channel (FCCH). Message header 210 comprises bits that indicate message 200's length and bits that distinguish message 200 from other IS-2000 compatible message types. Message CRC 240 comprises bits that indicate the CRC computed on message 200, and padding 230 comprises the number of bits needed for octet alignment given the variable size of PDU 220.

PDU 220 preferably comprises flags that indicate the message types (see above for a list of the types) of the messages that will be transmitted in the same paging slot (flags 221–223 and 225) and flag 228 that indicates the inclusion of quick paging channel (QPCH) indicators 229. QPCH indicators 229 indicate which paging hash categories have units that will be addressed by slotted pages or individually-addressed or multicast-addressed messages. Preferably, QPCH indicators 229 comprise a sequence of bits, each bit corresponding to one paging hash category as is done on CDMA 2000 QPCHs. However, the bit sequence, which is mostly zeroes, may be compressed to shorten the special paging message and thereby conserve bandwidth. Flag 227 indicates whether the relative transmission order in the paging slot within each group of messages of the same type will be by ascending communication unit addresses/IDs. Lastly, flag 224 indicates that at least one slotted page or an individually-addressed or multicast-addressed message did not fit in the current slot and it starts in the subsequent slot, while flag 226 indicates that there is another special page message, typically containing pages, in the current slot.

Figure 3:
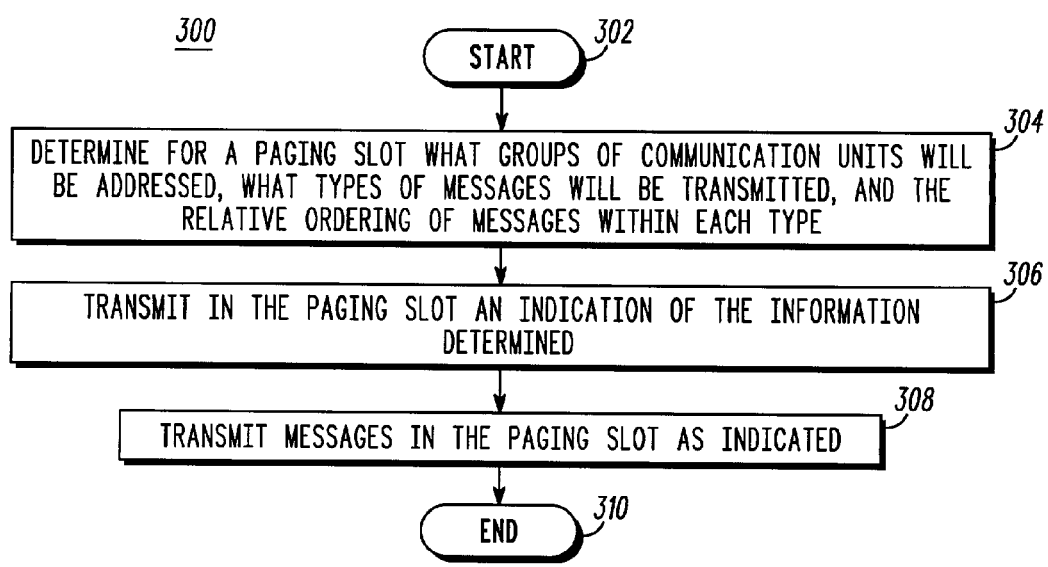
FIG. 3 is a logic flow diagram of steps executed by a communication infrastructure in accordance with a preferred embodiment of the present invention.

FIG. 3 is a logic flow diagram of steps executed by a communication infrastructure in accordance with a preferred embodiment of the present invention. Logic flow 300 begins (302) when the infrastructure determines (304), from the messages that will be transmitted during a paging slot, what message types will be transmitted, what the relative ordering of messages within each message type will be, based on the address of the destination communication units, and what paging hash group corresponds to the addressee of each message or page that will be transmitted. Preferably, the infrastructure then generates a special page message, which comprises the information determined, and transmits (306) it in the paging slot. The infrastructure will also include in the special page message as many pages for the communication units as they can be fit, such that the special page message fits in the first frame or half-frame of the paging slot. Following the special page message, the infrastructure transmits (308) the messages indicated in the special page message in groups according to message type and in the order indicated within each of these groups. Logic flow 300 then ends (310).

Figure 4:
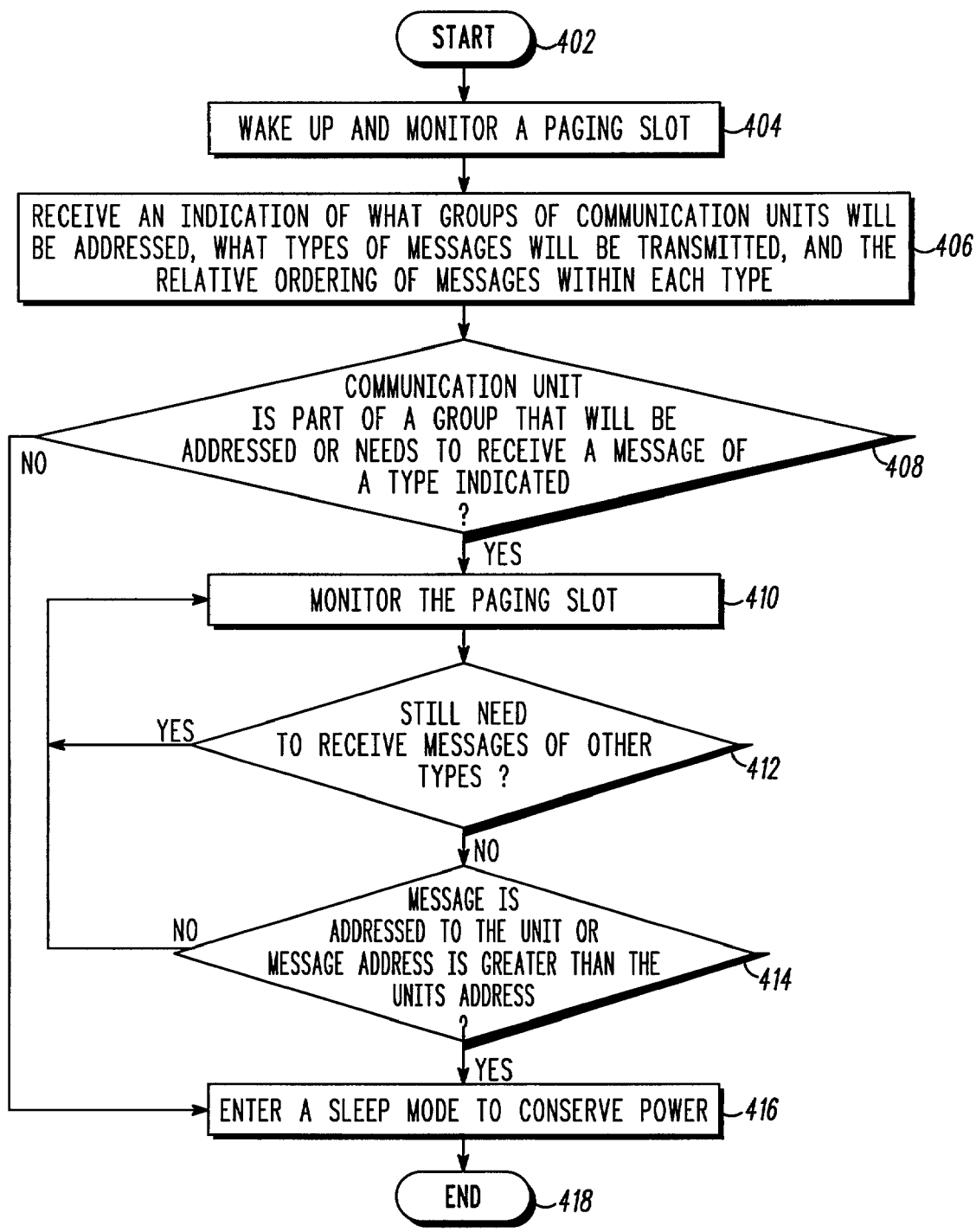
FIG. 4 is a logic flow diagram of steps executed by a communication unit in accordance with a preferred embodiment of the present invention.

FIG. 4 is a logic flow diagram of steps executed by a communication unit in accordance with a preferred embodiment of the present invention. Logic flow 400 begins (402) when the communication unit exits a sleep mode in which it was conserving power to monitor (404) a paging slot. The communication unit preferably receives (406) a special page message that indicates what message types will be transmitted in the paging slot, what the relative ordering of messages within each type will be, based on the address of the destination communication units, and what paging hash group corresponds to the addressee of each message or page that will be transmitted. Preferably, the relative ordering of messages within each type will be ascending order by address. Upon receipt of the special page message, the communication unit determines whether it needs to receive any of the messages of the types indicated or whether the paging hash group corresponding to its address is marked. If its paging hash group is marked, then at least one communication unit of those in its paging hash group will be addressed by (i.e., be the addressee of) a message in this paging slot. If (408) the communication unit's paging hash group is not marked and the communication unit does not need to receive messages of the types indicated, then the communication unit stops monitoring the paging slot and enters (416) a sleep mode to conserve power.

Otherwise (408), if it does need to receive one or more messages of one or more of the types indicated or if the paging hash group corresponding to its address is marked, the communication unit will continue monitoring (410) the paging slot, until it either receives a needed message or it determines that there is no message addressed to it or of a type that it needs. When (412) it begins receiving messages of the last message type that it needs, the monitoring will continue preferably until (414) the unit receives a message addressed to itself or until it receives a message addressed to a higher address than the unit's, assuming that the communication unit had received the indication in the special page message that the addresses are ordered. If it receives a message addressed to itself, then that message is the last message it needs to receive. If it receives a message addressed to a higher address than the unit's, then based on the message ordering (ascending address ordering) the unit determines that it will not receive a message addressed to itself. In either case, the communication unit does not need to receive any more messages in the paging slot. Thus, the communication unit stops monitoring the paging slot and enters (416) a sleep mode to conserve power. Logic flow 400 then ends (418).

The present invention allows communication units to return to a power-saving sleep mode more quickly than the prior art, resulting in greater power conservation and therefore an extended battery life or the ability to use a shorter paging cycle to shorten the call set-up time. By preferably receiving an indication of what message types will be transmitted by the communication infrastructure in a paging slot, what the relative ordering of messages within each type will be, and what paging hash group corresponds to the addressee of each message that will be transmitted, communication units can determine whether they need to continue monitoring the paging slot at all, and if they do, when they have received the last message they need. Communication units can thus enter a sleep mode before the paging slot ends, and many times, immediately upon receiving the indication.

While the present invention has been particularly shown and described with reference to particular embodiments thereof, it will be understood by those skilled in the art that various changes in form and details may be made therein without departing from the spirit and scope of the present invention.

What is claimed is:

1. A method for a communication unit to extend battery life comprising the steps of:
   exiting a sleep mode in which power is conserved to begin monitoring a paging slot;
   receiving in the paging slot an indication of what groups of messages will be transmitted by a communication infrastructure in the paging slot;
   determining whether any of the groups of messages indicated need to be received by the communication unit during the paging slot; and
   when the groups of messages indicated do not need to be received, entering a sleep mode to conserve power, wherein the indication of what groups of messages will be transmitted in the paging slot comprises an indication of what types of messages will be transmitted in the paging slot and wherein the method further comprises the step of:
   when at least one type of message indicated does need to be received, monitoring the paging slot to receive all of the messages in a group of needed messages before entering a sleep mode to conserve power, wherein the group of needed messages comprises at least one message of the at least one type of message indicated that does need to be received.

2. The method of claim 1 further comprising the step of receiving in the paging slot an indication of relative transmit ordering for at least some of the messages that will be transmitted during the paging slot, wherein the step of monitoring comprises the steps of:
   receiving at least one message in the group of needed messages;
   determining when all of the messages in the group of needed messages have been received based on the indication of relative ordering; and
   entering the sleep mode to conserve power before the paging slot ends.

3. The method of claim 2 wherein the indication of relative transmit ordering for at least some of the messages that will be transmitted during the paging slot comprises an indication of the relative transmit order of messages that will be transmitted within the same subgroup, wherein a subgroup includes all the messages of a particular message type that will be transmitted during the paging slot.

4. The method of claim 1 wherein the indication of what groups of messages will be transmitted during the paging slot comprises an indication of which groups of communication units will be addressed by messages transmitted during the paging slot.

5. The method of claim 4 wherein the indication of which groups of communication units will be addressed by messages transmitted during the paging slot comprises a sequence of bits that is compressed.

6. The method of claim 1 wherein the types of messages comprise at least one message type selected from the group consisting of broadcast-message type, system-overhead type, nonslotted-individually-addressed-or-multicast-message type, and slotted-individually-addressed-or-multicast-message type.

7. A method for a communication unit to extend battery life comprising the steps of:
   exiting a sleep mode in which power is conserved to begin monitoring a pacing slot;
   receiving in the paging slot an indication of what groups of messages will be transmitted by a communication infrastructure in the paging slot;
   determining whether any of the groups of messages indicated need to be received by the communication unit during the paging slot; and
   when the groups of messages indicated do not need to be received, entering a sleep mode to conserve power,
   wherein the indication of what groups of messages will be transmitted during the paging slot comprises an indication of which groups of communication units will be addressed by messages transmitted during the paging slot,
   wherein the indication of which groups of communication units will be addressed by messages transmitted during the paging slot comprises an indication of which paging hash categories of communication units will be addressed by messages transmitted during the paging slot.

8. A method for a communication infrastructure to facilitate communication units in extending their battery life, the method comprising the steps of:
- determining what groups of messages will be transmitted during a paging slot;
- transmitting in the paging slot an indication of what groups of messages will be transmitted during the paging slot to enable receiving communication units to enter a sleep mode and conserve power when the groups of messages indicated do not need to be received; and
- transmitting in the paging slot messages of the groups indicated, wherein the indication of what groups of messages will be transmitted in the paging slot comprises an indication of what message types will be transmitted in the paging slot and wherein the method further comprises the step of:
- transmitting in the paging slot an indication of relative transmit ordering for at least some of the messages that will be transmitted during the paging slot to enable the receiving communication units to enter a sleep mode and conserve power immediately after receiving the last message that needs to be received, as determined based on the relative transmit order indicated, wherein the step of transmitting messages of the type indicated comprises transmitting the messages in the relative transmit order indicated.

9. The method of claim 8 wherein the indication of relative transmit ordering for at least some of the messages that will be transmitted during the paging slot comprises an indication of the relative transmit order of messages that will be transmitted within the same subgroup, wherein a subgroup includes all the messages of a particular message type that will be transmitted during the paging slot.

10. The method of claim 8 wherein the indication of what groups of messages will be transmitted during the paging slot comprises an indication of which groups of communication units will be addressed by messages transmitted during the paging slot.

11. The method of claim 10 wherein the indication of which groups of communication units will be addressed by messages transmitted during the paging slot comprises a sequence of bits that is compressed.

12. A communication unit comprising:
- a receiver arranged to receive in a paging slot an indication of what groups of messages will be transmitted by a communication infrastructure during the paging slot; and
- a processor, coupled to the receiver, arranged to instruct the receiver to exit a sleep mode in which power is conserved and begin monitoring the paging slot, arranged to determine whether any of the groups of messages indicated need to be received by the communication unit during the paging slot, and arranged to instruct the receiver to enter a sleep mode to conserve power when the groups of messages indicated do not need to be received, wherein the indication of what groups of message will be transmitted in the paging slot comprises an indication of what message types will be transmitted in the paging slot, wherein the processor is further arranged to instruct the receiver to monitor the paging slot to receive all of the messages in a group of needed messages before entering a sleep mode to conserve power when at least one type of message indicated does need to be received, wherein the group of needed messages comprises at least one message of the at least one type of message indicated that does need to be received.

13. The communication unit of claim 12 wherein the receiver is further arranged to receive in the paging slot an indication of relative transmit ordering for at least some of the messages that will be transmitted during the paging slot and to receive at least one message in the group of needed messages and wherein the processor is further arranged to determine when all of the messages in the group of needed messages have been received based on the indication of relative ordering to instruct the receiver to enter the sleep mode to conserve power before the paging slot ends.

14. The communication unit of claim 12 wherein the indication of what groups of messages will be transmitted during the paging slot comprises an indication of which groups of communication units will be addressed by messages transmitted during the paging slot.

15. A communication infrastructure comprising:
- a controller arranged to determine what groups of messages will be transmitted during a paging slot; and
- a base site, coupled to the controller, arranged to transmit in a paging slot an indication of what groups of messages will be transmitted during the paging slot to enable receiving communication units to enter a sleep mode and conserve power when the groups of messages indicated do not need to be received and arranged to transmit in the paging slot messages of the groups indicated, wherein the indication of what groups of messages will be transmitted during the paging slot comprises an indication of which groups of communication units will be addressed by messages transmitted during the paging slot.

16. The communication infrastructure of claim 15 wherein the communication infrastructure is a code division multiple access (CDMA) communication infrastructure.

17. The communication infrastructure of claim 15 wherein the indication of what groups of messages will be transmitted is transmitted on a channel selected from the group consisting of a paging channel (PCH) and a forward common control channel (FCCH) and is transmitted with a message that is encoded, interleaved, and protected by cyclical redundancy checking (CRC).

18. A communication infrastructure comprising:
- a controller arranged to determine what groups of messages will be transmitted during a paging slot; and
- a base site, coupled to the controller, arranged to transmit in a paging slot an indication of what groups of messages will be transmitted during the paging slot to enable receiving communication units to enter a sleep mode and conserve power when the groups of messages indicated do not need to be received and arranged to transmit in the paging slot messages of the groups indicated, wherein the indication of what groups of messages will be transmitted in the paging slot comprises an indication of what message types will be transmitted in the paging slot, wherein the base site is further arranged to transmit in the paging slot an indication of relative transmit ordering for at least some of the messages that will be transmitted during the paging slot to enable the receiving communication units to enter a sleep mode and conserve power immediately after receiving the last message that needs to be received, as determined based on the relative transmit order indicated, and wherein the base site is further arranged to transmit the messages in the relative transmit order indicated.

* * * * *